Dec. 18, 1934.  O. C. REEVES  1,984,598
WEIGHING SCALE
Filed Nov. 15, 1928
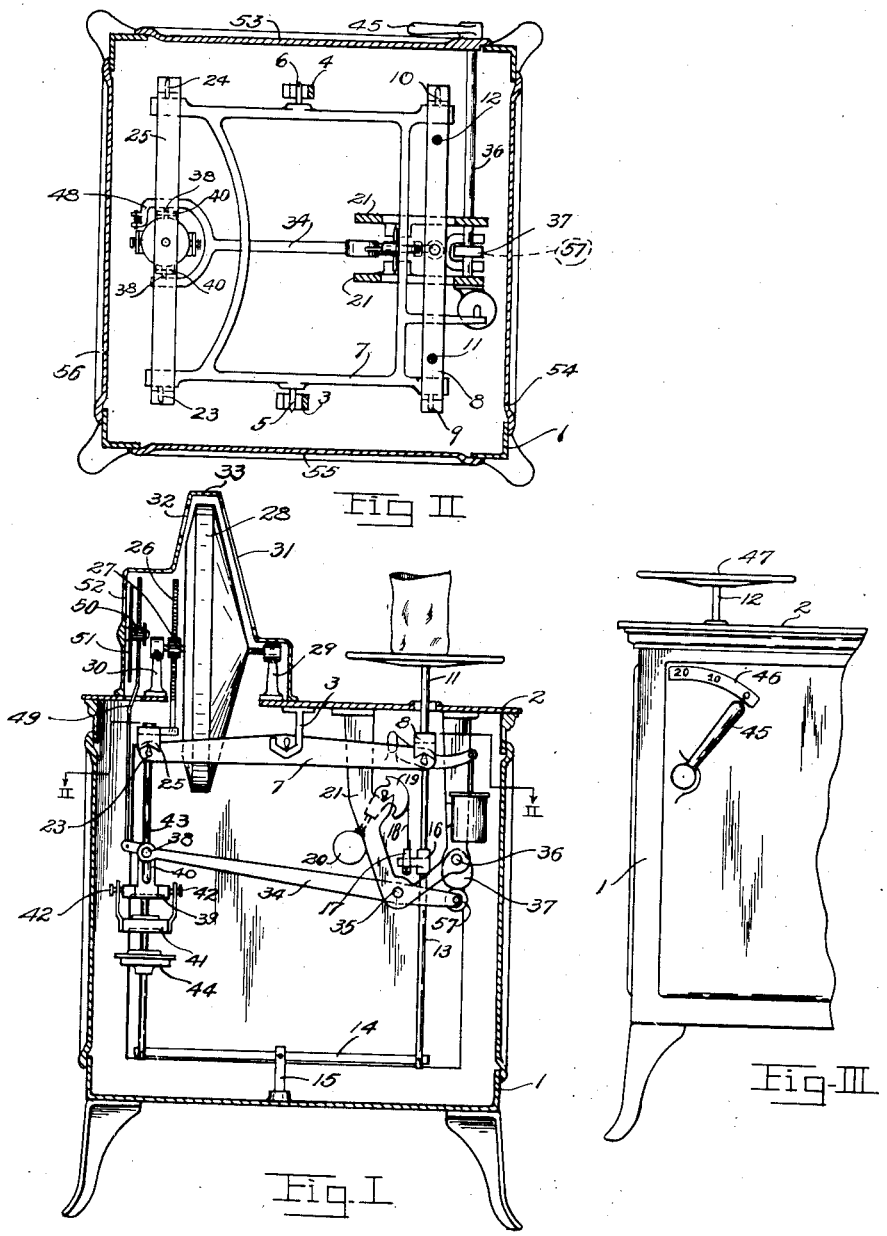
Fig. II
Fig. I
Fig. III
Inventor
Orwell C. Reeves
By C. D. Marshall
Attorney Patented Dec. 18, 1934

1,984,598

UNITED STATES PATENT OFFICE 1,984,598

WEIGHING SCALE

Orwell C. Reeves, Toledo, Ohio, assignor to Toledo Scale Company, Toledo, Ohio, a corporation of New Jersey Application November 15, 1928, Serial No. 319,570

4 Claims. (Cl. 265—62)

This invention relates to weighing scales, and particularly to scales for use in retail shops.

One of the principal objects of this invention is the provision of an improved weighing scale in which the weighing mechanism is supported and housed in a floor cabinet of such height that the scale is adapted to be used without a counter or other elevated support i. e. waist high to the average adult.

Another important object of the invention is the provision of a cabinet scale of this type in which the load receiver and the indicator are located above the housing with the load receiver in front of the indicator so that the indicator faces the scale operator over the load receiver.

Another object is the provision of a scale having a chart on which a large number of price computations may be printed without crowding each other.

Another object is the provision of means whereby the normal capacity of the scale may be conveniently increased.

A further object is the provision of means for indicating the amount of capacity increase, infallibly to both the customer and the operator.

A still further object of this invention is the provision of a large platter or commodity receiver on which light, but bulky material may be weighed without contacting any of the stationary parts of the scale.

Another object is the provision of improved means for maintaining the condition of level of the load receiver.

Another object is the provision of means whereby the scale may be completely assembled and adjusted before placing it into its cabinet.

Still another object is the provision of means whereby the scale may be serviced and adjusted without removing it from its cabinet.

Other objects and advantages will be apparent from the following description, in which reference is had to the accompanying drawing illustrating a preferred embodiment of my invention and wherein similar reference numerals designate similar parts throughout the several views.

In the drawing:—

Figure I is a side elevational view, with the cabinet in section, of a scale mechanism embodying my invention.

Figure II is a plan view, sectioned along the line II—II of Figure I.

Figure III is a fragmentary elevational view of the opposite side showing the manipulating and operator's indicating means of the capacity increasing device.

Referring to the drawing in detail, the scale illustrated comprises a cabinet 1, preferably a waist high light, rigid steel structure which is capable of receiving a sanitary porcelain enamel finish. The cabinet top 2 has secured to it depending fulcrum brackets 3 and 4 in which the fulcrum pivots 5 and 6 of lever 7 are mounted. The load spider 8 which rests on the load pivots 9 and 10 of the lever 7 is provided with two upwardly extending posts 11 and 12, on which the platform or load receiver is mounted. The condition of level of the platform or load receiver, is maintained by a depending spider stem 13 and a check link 14. The check link 14 is pivotally fastened to the depending spider stem at one end and to a rigid shift post 15 on the other, thus forming a parallelogram with the load arm of the lever.

It is well known that the constancy of the indication, with reference to the position of the load on the platform, is dependent on the accuracy of the parallelogram formed by the check link. In counter scales of the types heretofore known, this accuracy is obtained by very careful machining and the elimination of all "loose play", as due to the limitation of the platform height, the spider stem must be relatively short. In the scale disclosed, the spider stem is more than four times the length of one-half the platform from front to back. In the scale of the present invention, it will readily be seen that, due to the extremely long spider stem, pressures caused by the load being placed adjacent to the edges of the platform are light and have no tendency to tip the platform. This eliminates expensive machine operations and hand adjustments, resulting in lower production costs and selling prices.

An arm 16 is secured to the spider stem and is provided with a nose pivot which engages a stirrup 17 fastened to a metallic ribbon 18 which overlies and is secured to the cam 19 of the pendulum 20. The pendulum 20 is so designed and calculated to counterbalance a load on the platform to the extent of the chart capacity. The pivots on which the pendulum is fulcrumed rest in suitable bearings secured to the fulcrum bracket 21 secured to, and depending from the cabinet top 2.

Resting on the pivots 23 and 24 is the unit weight spider 25, on which is suitably mounted the rack 26 which meshes with the pinion 27 mounted on the shaft of the chart 28. A load placed on the platform depresses the lever 7, spider 8 and all the members attached thereto.

The pendulum 20 connected by the metallic ribbon, which overlies its cam, to the spider stem, is swung outwardly until equilibrium is again established. The opposite end of the lever 7, to which the rack rod is attached, is correspondingly raised and the rack meshing with the pinion translates the reciprocatory motion of the lever into rotation of the chart. The shaft of the chart 28 rests in anti-friction bearings within the stands 29 and 30. As the movement of the rack is always proportional to the weight of the load, this weight is reliably indicated by the co-operation of the chart with an index (not shown), in the windows 31 and 32 of the chart housing 33.

It is a great advantage to have a large movement of the chart for small increments of loads, and it will be seen that this is easily attained in the scale embodying my invention. The chart may be made relatively large, as only a portion of the chart projects above the cabinet.

It is well known that in retail stores the great majority of sales are below a certain weight. It is the intention, in building the scale of my invention, to make the chart of such capacity to weigh the majority of drafts automatically and provide manipulative capacity increasing means for weighing the occasional drafts of greater weight. The lever 34 is fulcrumed on an axle 35 secured to the bracket 21. The bracket 21 is also provided with bearings for a shaft 36. Secured to this shaft is a cam 37 located so that it contacts a roller mounted in the forked end of the lever 34. The other end of lever 34 is also bifurcated and is equipped with two inwardly extending pins 38 from which the unit weight 39 is suspended by its slotted ears 40. A similar weight 41 is suspended from the pins 42 projecting from the sides of the weight 39. Secured to, and depending from the unit weight spider 25, and extending through apertures in the unit weights 39 and 41 is a rod 43. Its lower end is pivotally connected to the check link 14 to constrain its movement. A weight rest 44 surrounds the depending rod 43 and is located to receive the unit weights.

Assuming that the chart capacity is ten pounds, loads up to and including this weight are instantly and reliably indicated on the chart by the weight of the article acting through the scale mechanism. When, however, it is desired to weigh loads beyond the capacity of the automatic chart, a part of the load equal to the chart capacity is counterbalanced by one of the counter weights. The handle 45, securely fastened to the end of the shaft 36, is moved away from its normal position under the zero mark on the strip 46, until it points to the numeral 10. The cam 37, also mounted on the shaft 36, assumes a position in which the distance from the point where it contacts the roller 57 to its center of revolution has diminished, allowing the end of the lever 34 from which the unit weights are suspended, to drop and deposit the unit weight 41 on the weight rest 44. Assuming that the load on the platform weighs fourteen pounds and three ounces, the amount of the chart capacity, ten pounds, is counterbalanced by the unit weight and the remainder, four pounds and three ounces, is counterbalanced by the pendulum and indicated on the chart.

In case the load is greater than twenty pounds, the movement of the handle 45 from the numeral 10 to the numeral 20 will deposit the second unit weight 39 on the weight rest and counterbalance an additional load of ten pounds on the load platform 47.

The position of the handle 45 with reference to the numerals on the strip 46, visibly indicates to the operator the number of unit weights in use and the amount of weight which must be added to the weight indicated on the chart. To indicate this amount to the customer, additional indicating means are provided. An extension 48 on the lever 34 has secured thereto, an upwardly extending rack rod 49, the teeth of which are in engagement with the pinion 50 which is attached to a rotating target 51 located behind a window 52 in the housing 33, through which the proper numeral is exposed. The numerals printed on the target are similar to the ones on the strip 46.

After the scale has been placed in use in a store or shop, it is essential that the mechanism is easily accessible for the purpose of repair and service. This is accomplished by making the sides 53, 54, 55 and 56 of the cabinet removable.

It will be seen from the foregoing description, that all the objects are effectively attained. The embodiment of my invention herein shown and described is to be regarded as illustrative only, and it is understood that the invention is susceptible to variation, modification and change within the scope of the subjoined claims.

Having described my invention, I claim:

1. In a scale of the type described, in combination, a cabinet adapted to stand on the floor, said cabinet having a cover, lever mechanism and load counterbalancing mechanism, including a pendulum within said cabinet, means for supporting said mechanisms from said cover, a load receptacle supported on said lever mechanism, means for indicating the weight of a load connected to said lever mechanism, checking means for maintaining the condition of level of said load receiver and means for operatively connecting said checking means to said pendulum.

2. In a scale of the type described, in combination, a cabinet of counter height adapted to stand on the floor, said cabinet having a cover, a load lever supported from said cover within said cabinet, load receiving means mounted upon said lever and located above said cover, counterbalancing means for offsetting a part of the load connected thereto, unit weight counterbalancing means for offsetting the remainder of the load and indicating means for indicating the amount of the load offset by said unit weight offsetting means.

3. In a scale of the type described, in combination, a cabinet adapted to stand on the floor, said cabinet having a cover, means secured to said cover for supporting a mean lever, said lever having pivotally mounted thereon a load spider and load receiver and unit weight spider and receiver to act in opposition to said load receiver, a plurality of unit weights, a unit weight lever adapted to deposit said unit weights freely on said unit weight receiver, and means including a cam for operating said unit weight lever and means operatively connected to said unit weight lever and said unit weight lever operating means to show the amount of load so offset.

4. In a scale of the type described, in combination, a cabinet of counter height adapted to stand on the floor, said cabinet having a cover, means secured to said cover for supporting lever mechanism load-receiving means supported by said lever mechanism and located above said cover, pendulum counterbalancing mechanism for offsetting part of the load, unit weight counterbalancing mechanism for offsetting the remainder of the load within said cabinet beneath said cover and indicating means including a relatively movable chart and index to show the amount of the load offset by said pendulum counterbalancing mechanism and rotatable indicating means to show the amount of the load offset by said unit weight counterbalancing means, located above said cover, and removable means on said cabinet for gaining access to said mechanisms within said cabinet.

ORWELL C. REEVES.